Figure 1:
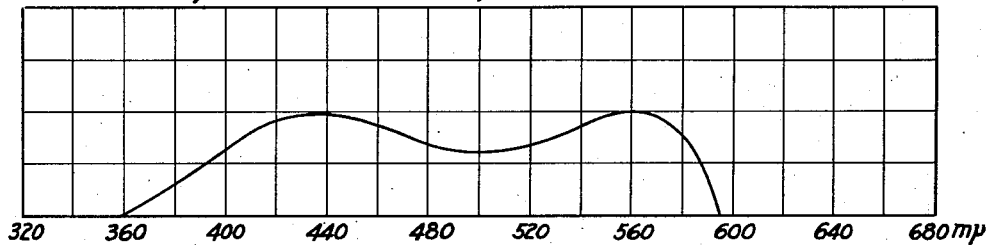

Sept. 3, 1940.    L. G. S. BROOKER ET AL    2,213,238
HYDROXYALKYL CYANINE DYE AND PHOTOGRAPHIC EMULSION Filed March 29, 1937

1'-ETHYL-1' γ-HYDROXYPROPYL - 2,2'- CYANINE IODIDE

8-ETHYL - 2,2'-DI-β-HYDROXYETHYLTHIACARBOCYANINE IODIDE 2,2'-DI-γ-HYDROXYPROPYLTHIATRICARBOCYANINE IODIDE 1,1'-DI-β-HYDROXYETHYL-4,4'-CARBOCYANINE IODIDE

Leslie G. S. Brooker
Lloyd A. Smith
INVENTORS

BY
N. M. Perrins
Daniel J. Mayne
ATTORNEYS

Patented Sept. 3, 1940

2,213,238

UNITED STATES PATENT OFFICE 2,213,238

HYDROXYALKYL CYANINE DYE AND PHOTOGRAPHIC EMULSION

Leslie G. S. Brooker and Lloyd A. Smith, Rochester, N. Y., assignors to Eastman Kodak Company, Rochester, N. Y., a corporation of New Jersey Application March 29, 1937, Serial No. 133,524

13 Claims. (Cl. 95—7)

This invention relates to new dyes and to photographic emulsions therefrom. These new dyes can be called hydroxyalkyl cyanine dyes.

A number of cyanine dyes are known and some of these have been found to sensitize photographic emulsions in a variety of useful manners. We have now found that cyanine dyes of the sensitizing types containing hydroxyalkyl groups on one or both of the two cyanine nitrogen atoms are very good sensitizers of photographic emulsions. Our new cyanine dyes, particularly those which sensitize for longer wavelengths and for the infra-red, sensitize photographic emulsions strongly and show a lesser tendency to fog the emulsions than do ordinary cyanine dyes. Moreover our new cyanine dyes are more compatible with emulsions.

Accordingly, it is among the objects of our invention to provide new photographic emulsions which are strongly sensitized particularly for the longer wavelengths of light and for the infrared and which show a lesser tendency to fog. A further object is to provide a process for sensitizing photographic emulsions particularly for the longer wavelengths and the infra-red. A still further object is to provide new cyanine dyes and intermediates therefor and a process for preparing the new dyes and intermediates. Other more specific objects will become apparent upon a complete perusal of the specification and claims.

Our new dyes can be prepared from cyclammonium quaternary salts made from heterocyclic nitrogen bases and halohydrins. We have found that bromohydrins, such as ethylene bromohydrins or propylene bromohydrins for example, can advantageously be employed. The heterocyclic nitrogen bases and the halohydrins are merely heated together to form the quaternary halide. Crude quaternary bromides prepared in this manner are advantageously converted into the iodides before employing to prepare our new cyanine dyes.

While the process of preparing these new hydroxyalkyl quaternary halides is subject to variation particularly as respects the nature of the heterocyclic nitrogen bases, the nature of the halohydrins, the proportions of the reactants, the temperatures, the time of reaction and the method of isolation and purification of the quaternary halides, the following examples will serve to illustrate the mode of practicing the preparation of our new quaternary halides.

EXAMPLE 1.—*1-methylbenzothiazole β-hydroxyethiodide*

29.8 g. (1 mol.) of 1-methylbenzothiazole and 25 g. (1 mol.) of ethylene bromohydrin were heated at 100° C. for about 30 hours. The crude bromide was washed with ether and then converted to the iodide by dissolving in hot water and treating the solution with a hot aqueous solution of potassium iodide. (40 g. per 40 cc. of water). The iodide was twice recrystallized from methyl alcohol. It was obtained as colorless crystals melting at 177° to 179° C. with decomposition.

EXAMPLE 2.—*Quinaldine β-hydroxyethiodide*

28.6 g. (1 mol.) of quinaldine and 25 g. (1 mol.) of ethylene bromohydrin were heated at 100° C. for about 24 hours. The crude bromide was washed with ether and then with acetone. The washed product was then converted into the iodide by dissolving in 30 cc. of hot water and treating the resulting solution with a hot aqueous solution of potassium iodide (29 g. in 25 cc. of water). The crude iodide was obtained as grayish crystals which were twice recrystallized from methyl alcohol and obtained in a colorless form melting at 220° to 221° C. with decomposition.

EXAMPLE 3.—*Lepidine β-hydroxyethiodide*

28.6 g. (1 mol.) of lepidine and 25 g. (1 mol.) ethylene bromohydrin were heated on a steam bath for about 4 hours. The mixture set practically solid after one hour of heating. The crude bromide was ground with diethyl ether and washed with acetone. The crude bromide was converted to the iodide by dissolving in hot water and treating the solution with a hot solution of potassium iodide (44 g. per 40 cc. of water). The crude iodide was obtained as yellow crystals which were recrystallized from methyl alcohol and obtained as crystals melting at 187° to 188° C. with decomposition.

EXAMPLE 4.—*1-methylbenzothiazole-γ-hydroxypropiodide*

22.5 g. (1 mol.) of 1-methylbenzothiazole and 21 g. (1 mol.) of trimethylene bromohydrin were heated on the steam bath for about 24 hours. The reaction mixture had set to a practically solid mass of crystals. The crude bromide was dissolved in 25 cc. of hot water and treated with a hot solution of potassium iodide (35 g. in 25 cc. of water). The crude iodide was obtained as yellowish crystals. It was twice recrystallized (decolorized with activated charcoal) from methyl alcohol and obtained as colorless crystals melting at 131° to 132° C. with decomposition.

EXAMPLE 5.—*Quinaldine γ-hydroxypropobromide*

21.5 g. (1 mol.) of quinaldine and 21.0 g. (1 mol.) of trimethylene bromohydrin were heated on a steam bath for about 24 hours. The reaction mass was a solid crystalline mass. It was recrystallized from a mixture of methyl alcohol and acetone (decolorized with activated charcoal) and obtained as slightly brownish crystals melting at 168° to 170° C. with decomposition.

EXAMPLE 6.—*Lepidine γ-hydroxypropobromide*

21.5 g. (1 mol.) of lepidine and 21.0 g. (1 mol.) of trimethylene bromohydrin were heated on the steam bath for about 6 hours. The reaction mixture set to a solid mass after about an hour of heating. It was recrystallized from methyl alcohol and obtained as colorless crystals melting at 156° to 158° C. with decomposition.

Still further examples of the preparation of our new hydroxyalkyl quaternary halides could be given, but the above are sufficient to teach those skilled in art how to prepare and recognize reaction products of heterocyclic nitrogen bases and halohydrins. Heterocyclic nitrogen bases such as 2-halogenoquinolines, μ-methylnaphthothiazoles, 1-methylbenzoxazole, 1-ethylbenzothiazole, 1-methylbenzoselenazole, μ-methylnaphthoxazole, α-picoline, γ-picoline, 4-chloro-1-methylbenzothiazole, 2, 4-dimethylthiazole, 2-methyl-4-phenylthiazole, 2-methyl-4-phenyloxazole, 2-methyl-4-phenylselenazole, 1-methylmercaptobenzothiazole, 1-methylmercaptobenzoxazole, 1-ethylmercaptobenzothiazole, 2- methylthiazoline, 1-phenylmercaptobenzothiazole, or 2, 3, 3-dimethylindolenine for example can be likewise reacted with halohydrins. Chlorohydrins can be employed instead of bromohydrins. The temperature employed is advantageously about 100° C. though lower or higher temperatures can be employed. The potassium iodide can be replaced by other soluble iodides, e. g. sodium iodide.

Our new hydroxyalkyl quaternary halides can be converted into other salts by proper treatment. For example our halides can be converted into the corresponding perchlorates by dissolving the halides in methyl alcohol or water and treating the solution with sodium perchlorate.

Our new hydroxyalkyl quaternary salts can be employed in preparing cyanine dyes of various kinds. The following processes will be illustrative.

Symmetrical simple cyanines can be readily prepared from our new hydroxyalkyl quaternary salts, such as those prepared from 1-methylbenzothiazole, 1-methylbenzoxazole, μ-methylbenzoxazoles or 1-methylbenzoselenazole for example, by condensing with our new hydroxyalkyl quaternary salts or ordinary quaternary salts derived from a 1-alkylmercaptobenzothiazole, benzoxazole, naphthoxazole or benzoselenazole for example, in the presence of a basic condensing agent. 1-methylmercapto derivatives are advantageously employed. As condensing agents, sodium ethylate, sodium acetate or sodium carbonate can be employed for example. However, strong organic bases particularly strong tertiary organic bases, such as triethylamine, tributylamine, triethanolamine or N-methylpiperidine, i. e. an organic base having a dissociation constant substantially greater than that of pyridine can advantageously be employed. The condensations are advantageously effected in a diluent such as a lower aliphatic alcohol that is one containing from one to four carbon atoms. Ethyl alcohol is particularly useful. The condensations are carried out by reacting together one molecular proportion of each of the quaternary salts employing at least two molecular proportions of the condensing agent at the boiling temperature of ethyl alcohol. The diluent is advantageously substantially anhydrous and employed in an amount which will permit the dye formed to separate therefrom at least upon cooling. Water can be added to precipitate the dye if necessary. Ordinarily the condensations are complete after heating 15 or 20 minutes.

Unsymmetrical simple cyanines can readily be prepared from our new hydroxyalkyl quaternary salts derived from heterocyclic nitrogen bases such as those set forth in the above paragraph for example, by condensing appropriate 1-methyl compounds with appropriate 1-alkylmercapto compounds. For example simple oxathiocyanine dyes can be prepared by condensing hydroxyalkyl quaternary salts of 1-methylbenzothiazole with hydroxyalkyl quaternary salts of 1-methylmercaptobenzoxazole in the manner set forth in the above paragraph.

Instead of hydroxyalkyl quaternary salts of 1-alkylmercapto compounds, 1-arylmercapto compounds such as 1-phenylmercaptobenzothiazole can be employed in the form of their hydroxyalkyl quaternary salts. Arylmercapto compounds can be prepared by condensing heterocyclic nitrogen bases containing a reactive chlorine atom in the alpha or gamma position, i. e. one of the so-called reactive positions, with a thiophenol. For example, 1-phenylmercaptobenzothiazole is prepared as follows: 88.0 g. (2 mol.) of thiophenol and 80.8 g. (2 mol.) of triethylamine were added gradually and alternately to 67.8 g. (1 mol.) of 1-chlorobenzothiazole with gentle warming. The reaction mixture was then heated at about 95° C. for about 24 hours, cooled and treated with 300 cc. of cold water and then 250 cc. of an aqueous solution of sodium hydroxide containing 56 cc. of 40% aqueous sodium hydroxide. The 1-phenylmercapto compound was extracted with diethylether. The extract was washed with water and dried over anhydrous calcium chloride and distilled. 1-phenylmercaptobenzothiazole was obtained as a slightly yellowish liquid boiling at 183° to 187° C. at 3 mm. of mercury pressure. 2-phenylmercaptoquinoline was prepared in the same manner employing 49.0 g. (1 mol.) of 2-chloroquinoline instead of 67.8 g. of 1-chlorobenzothiazole. 2-phenylmercaptoquinoline was obtained as a slightly yellowish liquid boiling at 188° to 190° C. at 3 mm. of mercury pressure. The 1-phenylmercaptobenzothiazole and 2-phenylmercaptoquinoline were converted into hydroxyalkyl quaternary salts as illustrated in the above examples. They can also be converted into ordinary quaternary salts by heating with alkyl iodides such as ethyl iodide. For example 36.5 g. (1 mol.) of 1-phenylmercaptobenzothiazole and 34.1 g. (1.5 mol.) were heated together in a sealed glass tube at 100° C. for 88 hours. The reaction product was stirred with ether and then in acetone until nearly colorless. The ethiodide of 2-phenylmercaptoquinoline was prepared in the same manner employing 2 molecular proportions of ethyl iodide. Only 18 hours of heating were necessary.

By the process given above, 2,2'-di-β-hydroxyethylthiacyanine iodide, 2,2'-di-β-hydroxyethyloxacyanine iodide, 2,2'-di-β-hydroxyethylselenacyanine iodide, 2,2'-di-β-hydroxyethyl-3, 4, 3', 4'-dibenzoxacyanine iodide, 2,2'-di-β-hydroxyethyloxathiacyanine iodide, 2,2-di-β-hyroxyethylselenathiacyanine iodide, 2,2'-di-β-hydroxyethyl-3,4-benzothiacyanine iodide, 2-ethyl-1'-β-hydroxyethylthiacyanine iodide can be prepared for example. Moreover, unsymmetrical simple cyanine dyes such as 3,2'-di-β-hydroxyethyl-4-phenylthiazolothiacyanine iodide, 3,2'-di-β-hydroxyethyl-4-phenyloxazolothiacyanine iodide and 2,2'-di-β-hydroxypropylthiacyanine iodide can be prepared by our new process.

Unsymmetrical simple cyanines containing a quinoline nucleus, linked through it 2-position, i. e. pseudocyanines, can be readily prepared from our new hydroxyalkyl quaternary salts derived from 2-halogenoquinolines by condensing with our new hydroxyalkyl quaternary salts derived from 1-methylbenzothiazole, benzoxazole, benzoselenazole, μ-methylnaphthazoles, μ-methylnaphthiozoles, 2-methylthiazoles, 2-methyloxazoles, 2-methylselenazoles, quinaldine, benzoquinaldine or pyridine for example. Likewise pseudocyanine dyes can be prepared from our hydroxyalkyl quinaldines by condensing with 2-iodoquinoline or 5,5-benzoquinoline hydroxyalkyl quaternary salts or ordinary quaternary salts or with hydroxyalkyl quaternary salts of 1-alkylmercapto benzoxazoles, benzothiazoles or benzoselenazoles for example or with 1-arylmercaptobenzothiazole or 2-arylmercaptoquinoline hydroxyalkyl quaternary salts for example. As illustrated in the following examples the pseudocyanine condensations are effected in the presence of basic condensing agents. Sodium ethylate or sodium carbonate can be used. However, a strong organic base particularly tertiary strong organic bases are advantageously employed. The quaternary salts are advantageously employed in equimolecular proportions with two molecular proportions of the basic condensing agent. Diluents such as ethyl alcohol are advantageously employed.

Unsymmetrical simple cyanines containing a pyridine nucleus, i. e. pyridopseudocyanines can be readily prepared from our new hydroxyalkyl quaternary salts derived from 2-methylthiazoles, 2-methyloxazoles and 2-methylselenazoles for example, by condensation with 2-iodopyridine quaternary salts in the presence of a basic condensing agent.

Unsymmetrical simple cyanines containing a quinoline nucleus linked through its 4-position, i. e. isocyanine dyes can be readily prepared from our new hydroxyalkyl quaternary salts, such as of 1-methylbenzothiazole, 1-methylbenzoxazole, N-methylbenzoselenazole quinaldine or lepidine for example, by reaction with quinoline hydroxyalkyl quaternary salts or ordinary quinoline quaternary salts, in the presence of a basic substance such as sodium ethylate.

Carbocyanines can be readily prepared from our new hydroxyalkyl quaternary salts, such as those derived from quinaldine, lepidine, 1-methylbenzothiazole, 1-methylbenzoxazole, 1-methylbenzoselenazole, μ-methylnaphthoselenazole, μ-methylnaphthoxazoles, 2,4-dimethylthiazole, 2-methyl-4-phenylthiazole, 2-methylthiazoline or 2,3,3-trimethylindolenine for example, by condensing our new quaternary salts with ethyl orthoformate in the presence of pyridine. The pyridine is advantageously anhydrous and serves as a condensing agent and diluent. The orthoformate is advantageously employed in excess. The condensations take place at the temperature of boiling pyridine. The dyes separate from the reaction mixture at least upon cooling.

Carbocyanines substituted at the central carbon atom of the trimethenyl chain can readily be prepared from our new hydroxyalkyl quaternary salts such as those derived from quinaldine, 1-methylbenzothiazole, N-methylbenzoxazole, 1-methylbenzoselenazole, μ-methylnaphthothiazole, 2,4-dimethylthiazole, 2-methyl-4-phenylthiazole for example by condensing our new hydroxyalkyl quaternary salts with ethyl orthoacetate our new quaternary salts with ethyl orthoacetate, ethyl orthopropionate or ethyl orthobenzoate for example, in the presence of pyridine as illustrated in the following examples.

Dicarbocyanine dyes can be readily prepared from our new hydroxyalkyl quaternary salts, such as those derived from quinaldine, lepidine, 1-methylbenzothiazole, 1-methylbenzoselenazole or μ-methylnaphthothiazoles for example, by our new quaternary salts with a compound of the following general formula:

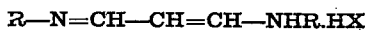

$$R-N=CH-CH=CH-NHR.HX$$

wherein R represents an aryl group, for example phenyl or tolyl and X represents an acid radical. β-anilinoacrolein anil in the form of its hydrochloride or hydrobromide is particularly useful. α-bromo-or-chloro-β-anilinoacrolein anil be employed. The condensations are advantageously carried out in the presence of a basic condensing agent. Strong organic bases are particularly useful. The condensations are advantageously carried out employing two molecular proportions of our new hydroxyalkyl quaternary salts to each molecular proportion of acrolein anil salt. At least two molecular proportions of condensing agent are advantageously employed. The process is illustrated in the following examples.

Unsymmetrical carbocyanines can be prepared from our new hydroxyalkyl quaternary salts by, condensing those such as are derived from 1-methylbenzothiazole, 1-methylbenzoxazole, quinaldine and μ-methylnaphthothiazoles for example, with condensation products of diphenylformamidine and cyclammonium alkyl quaternary salts containing a reactive methyl group such as are described in British Patent 344,409. The condensations are advantageously effected using equimolecular proportions of our new hydroxyalkyl quaternary salts and the condensation product, in the presence of a basic condensing agent, advantageously a strong organic base.

Tricarbocyanine dyes can be readily prepared from our new hydroxyalkyl quaternary salts, such as those derived from 2-methylthiazole, 2,4-dimethylthiazole, 2-methylthiazoline, 1-methylbenzothiazole, μ-methylnaphthothiazole, quinaldine, lepidine, 2,3,3-trimethylindolenine or benzoselenazole for example, by condensing our new quaternary salts with a compound of the following general formula:

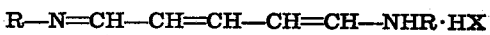

$$R-N=CH-CH=CH-CH=CH-NHR \cdot HX$$

wherein R represents an aryl group for example phenyl or tolyl and X represents an acid radical, Glutaconic aldehyde dianilide in the form of its hydrochloride is particularly useful. The condensations are advantageously carried out in the presence of a basic condensing agent. Sodium ethylate can be used, but the yields are greatly improved when the condensing agent is a strong organic base, such as triethylamine, N-methylpiperidine, piperidine, triethanolamine, diethylamine, or tributylamine for example, i. e. an organic base having a dissociation constant substantially greater than that of pyridine. The condensations are advantageously carried out employing our new hydroxyalkyl iodides two molecular proportions to each molecular proportion of glutaconic aldehyde dianilide hydrochloride or like compound. At least two molecular proportions of condensing agent are advantageously employed. The condensations are advantageously effected in a diluent such as will permit the dye formed to separate out at least upon chilling. Lower aliphatic alcohols i. e. alcohols of one to five carbon atoms, can be employed. Ethyl alcohol is particularly suitable. The condensations take place at room temperatures or upon gentle warming.

While the process of preparing our new dyes is subject to variation particularly as respects the nature of the reactants, the proportions of the reactants, the condensing agents, the time of reaction, the temperature, the nature and quantity of the diluents if any and the procedure of isolation and purification of the dyes, the following several examples will adequately illustrate the mood of practicing the preparation of our new dyes. These examples, designed to present the most useful information, are not intended to be limiting.

EXAMPLE 7.—*1'-ethyl-2-β-hydroxyethylthia-2'-cyanine iodide*

3.21 g. (1 mol.) of 1-methylbenzothiazole β-hydroxy-ethyl iodide, 4.1 g. (1 mol.) of 2-iodoquinoline ethiodide and 2.9 cc. (2.1 mols.) of triethylamine were heated to refluxing in 25 cc. of absolute ethyl alcohol for about 20 minutes. The dye separated from the cooled reaction mixture. The crude dye was washed with water and recrystallized from methyl alcohol. It was obtained as red needles melting at 277° to 279° C. with decomposition. Its methyl alcoholic solution was an orange color.

EXAMPLE 8.—*1-ethyl-1'-β-hydroxyethyl-2,2'-cyanine iodide*

3.15 g. (1 mol.) of quinaldine-β-hydroxy ethiodide, 4.1 g. (1 mol.) of 2-iodo quinoline ethiodide, and 2.9 cc. (2.1 moles) of triethylamine were heated to refluxing in 25 cc. of absolute ethyl alcohol for about 20 minutes. The dye separated from the cooled reaction mixture. The crude dye was filtered, washed with water, then with acetone, and recrystallized from methyl alcohol. It was obtained as beautiful garnet crystals with a green reflex and melting at 266° to 268° C. with decomposition. Its methyl alcoholic solution was pinkish-orange in color.

EXAMPLE 9.—*1'-ethyl-2-γ-hydroxypropylthia-2'-cyanine iodide*

1.68 grams (1. mol.) of 1-methylbenzthiazole-γ-hydroxy-propyl iodide, 2.06 g. (1 mol.) of 2-iodoquinoline ethiodide, and 1.5 cc. (2.1 mol.) of triethylamine were refluxed in 15 cc. of absolute ethyl alcohol for about 20 minutes. The dye separated from the cooled reaction mixture. The crude dye was recrystallized from methyl alcohol and obtained as a dull crystalline powder orange-red in color, and melting at 258 to 260° C. with decomposition. Its methyl alcoholic solution was a brownish-yellow color.

EXAMPLE 10.—*1-ethyl-1'-γ-hydroxypropyl-2,2'-cyanine iodide*

2.82 g. (1 mol.) of quinoline-γ-hydroxypropyl bromide, 4.1 g (1 mol.) of 2-iodoquinoline ethiodide, and 2.9 cc. (2.1 mol.) triethylamine were refluxed in 20 cc. of absolute ethyl alcohol for about 20 minutes. The crude dye separated from the cooled mixture. It was recrystallized from methyl alcohol and obtained as a crystalline powder, reddish-brown in color, and melting at 250 to 253° C. with decomposition. Its methyl alcoholic solution was a pinkish color.

EXAMPLE 11.—*1-ethyl-1'-γ-hydroxypropyl-2,4'-cyanine iodide*

2.82 g. (1 mol.) of lepidine-γ-hydroxypropyl bromide, 4.1 g. (1 mol.) of 2-iodoquinoline ethiodide, and 2.9 cc. (2.1 mol.) triethylamine were heated to refluxing in 20 cc. of absolute alcohol for about 20 minutes. The crude dye was precipitated as crystals from the reaction mixture with diethyl ether, filtered, and washed with water. It was recrystallized from methyl alcohol as dark crystals with a greenish reflex, and melting point at 186 to 188° C. with decomposition. Its methyl alcoholic solution was bluish-red in color.

EXAMPLE 12.—*1-ethyl-1'-β-hydroxyethyl-2,4'-cyanine iodide*

3.15 g. (1 mol.) of lepidine-β-hydroxyethiodide, 4.1 g. (1 mol.) of 2-iodoquinoline ethiodide, and 2.9 cc. (2.1 moles) triethylamine were heated to refluxing in 25 cc. of absolute alcohol for about 20 minutes. The crude dye separated from the cooled reaction mixture. It was washed first with acetone, then water, the process being repeated, if necessary, and finally recrystallized from methyl alcohol. The dye was obtained as beautiful crystals with a metallic green reflex, and melting at 243 to 245° C. with decomposition. Its methyl alcoholic solution was bluish-red in color.

EXAMPLE 13.—*2,2'-di-β-hydroxyethyl thiacarbocyanine iodide*

6.42 g. (2 mol.) of 1-methyl benzothiazole-β-hydroxyethiodide, 4.9 cc. (3 mol.) of ethyl orthoformate, and 25 cc. of pyridine were heated to refluxing for about 45 minutes. The crude dye separated from the cooled reaction mixture. It was washed with water, and recrystallized from methyl alcohol. The dye was obtained as minute needles, steel blue in color, and melting at 268 to 269° C. with decomposition. Its methyl alcoholic solution was bluish-red in color.

EXAMPLE 14.—*1,1'-di-β-hydroxyethyl-2,2'-carbocyanine iodide*

6.3 g. (2 moles) of quinaldine-β-hydroxyethiodide, 4.95 cc. (3 moles) of ethyl orthoformate, and 50 cc. of pyridine were heated to refluxing for about 4 hours. The crude dye separated from the cooled reaction mixture. It was washed with water, and recrystallized from methyl alcohol. The dye was obtained as minute needles, with a bright blue reflex, and melting at 270 to 272° C. with decomposition. Its methyl alcoholic solution was blue in color.

EXAMPLE 15.—*2,2'-di-γ-hydroxypropyl thiacarbocyanine iodide*

3.35 g. (2 mol.) of 1-methyl benzothiazole-γ-hydroxypropyl iodide, 2.5 cc. (3 mol.) of ethyl orthoformate, and 25 cc. of pyridine were heated to refluxing for about 45 minutes. The crude dye was cooled, and then precipitated from the reaction mixture with diethyl ether. It was recrystallized from methyl alcohol. The dye was obtained as a dark brown crystalline powder melting at 300° to 305° C. with decomposition. Its methyl alcoholic solution was bluish-red in color.

EXAMPLE 16.—*1,1'-di-γ-hydroxypropyl-2,2' - carbocyanine bromide*

5.64 g. (2 mol.) of quinoline-γ-hydroxypropyl bromide, 5.0 cc. (3 mol.) of ethyl orthoformate, and 25 cc. of pyridine were heated to refluxing for about 2 hours. The crude dye separated from the cooled reaction mixture. It was recrystallized from methyl alcohol. The dye was obtained as a satiny mat of green crystals, melting at 258° to 263° C. with decomposition. Its methyl alcoholic solution was blue in color.

EXAMPLE 17.—*2,2'-di-β-hydroxyethyl-8-methylthiacarbocyanine iodide*

6.42 g. (2 mol.) of 1-methylbenzothiazole-β-hydroxyethiodide, 4.86 g. (3 mol.) of ethyl orthoacetate, and 25 cc. of pyridine were heated to refluxing for about 45 minutes. The crude dye separated from the cooled reaction mixture. It was recrystallized from methyl alcohol. The dye was obtained as a mat of purplish crystals melting at 271 to 273° C. with decomposition. Its methyl alcoholic solution was bluish-red in color.

EXAMPLE 18.—*8-ethyl - 2,2' - di - β - hydroxyethyl thiacarbocyanine iodide*

6.42 g. (2 mol.) of 1-methyl benzothiazole-β-hydroxyethiodide, 4.02 g. (3 mol.) of trimethyl orthopropionate, and 25 cc. pyridine were heated to refluxing for about 45 minutes. The crude dye was precipitated from the cooled reaction mixture with diethyl ether, and washed with acetone. It was recrystallized from methyl alcohol as minute, purplish crystals melting at 263° to 264° C. with decomposition. Its methyl alcoholic solution was bluish-red in color.

EXAMPLE 19.—*1,1'-di-β-hydroxyethyl-4,4'-carbocyanine iodide and neocyanine-β-hydroxyethiodide*

6.3 g. (2 mol.) of lepidine-β-hydroxyethiodide, and 4.95 cc. (3 moles) of ethyl orthoformate were heated to refluxing in 30 cc. of acetic anhydride, in the presence of 0.9 g. (1.05 mol.) of sodium acetate, for about 9 minutes. The crude dye separated from the reaction mixture on slow cooling in two forms, the one as large crystals, and the other as very fine crystals. They were isolated in substantially pure forms by the use of a series of sieves (40, 60, 80, and 100 mesh) the process being repeated separately with the fraction containing the largest crystals, and the fraction containing the finest crystals.

The 4,4'-dye so obtained was a bright green crystalline substance melting at 257° to 259° C. with decomposition. Its methyl alcoholic solution was blue in color.

The neo dye so obtained was a dull brassy crystalline substance melting at 235° to 237° C. with decomposition. Its methyl alcoholic solution was green in color.

EXAMPLE 20.—*2,2'-di-β-hydroxyethyl thiadicarbocyanine bromide*

1.4 g. (2 mol.) of 1-methyl benzothiazole-β-hydroxyethyl bromide, 0.6 g. (1 mol.) of β-anilino acrolein anil hydrochloride, and 0.5 g. (1 mol.) of triethylamine were heated to refluxing in 20 cc. of absolute ethyl alcohol for about 20 minutes. The crude dye separated from the cooled reaction mixture. It was washed with water, cold methyl alcohol, and recrystallized from methyl alcohol as green crystals melting at 269° to 272° C. with decomposition.

EXAMPLE 21.—*2,2'-di-γ-hydroxypropyl thiatricarbocyanine iodide*

A mixture of 3.35 g. (2 mol.) of 1-methyl benzothiazole-γ-hydroxypropyl iodide, 1.43 g. (1 mol.) of glutaconic aldehyde dianilide hydrochloride, and 1.0 cc. (2 mol.) of piperidine in 50 cc. of absolute ethyl alcohol was allowed to stand for about 48 hours in an ice box. The crude dye had separated from the mixture during this time, and was recrystallized from methyl alcohol. The dye was obtained as dull green crystals melting at 210° to 215° C. with decomposition. Its methyl alcoholic solution was blue in color.

EXAMPLE 22.—*2,2'-di-β-hydroxyethyl thiatricarbocyanine iodide*

A mixture of 3.21 g. (2 mol.) of 1-methyl benzothiazole, 1.43 g. (1 mol.) of glutaconic aldehyde dianilide hydrochloride, and 1 cc. (2 mol.) of piperidene in 50 cc. of absolute ethyl alcohol was allowed to stand in an ice box for about 18 hours. The crude dye had separated from the mixture during this time, and was recrystallized from methyl alcohol. The dye was obtained as a felt of crystals with a greenish-bronze reflex and melting at 219° to 221° C. with decomposition. Its methyl alcoholic solution was blue in color.

Tetracarbocyanine dyes can be prepared from our new hydroxyalkyl quaternary salts such as those derived from 1-methylbenzothiazole, μ-methylnaphthothiazoles and quinaldine for example, by reacting our new hydroxyalkyl quaternary salts with compounds such as 4-acetoxy-Δ$^{3,5}$-heptadiene-1,7-dial di-tetra-hydroquinolide perchlorate. The reactions take place at room temperature, 25° C. or lower. In the case of our hydroxyalkyl quaternary salts derived from quinaldine, 1-methyl-α-naphthothiazole or 2-methyl-β-naphthothiazole the reactions should be allowed to take place at 0° to —10° C. Two molecular proportions of our new benzothiazole new quaternary salts were mixed with one molecular proportion of the heptadiene compound in sufficient pyridine to form a solution (about 10 to 15 cc. for each 2 or 2.5 grams of reactants). The whole was allowed to stand several hours (10 or 15). The dye was precipitated from solution with diethyl ether and obtained as coppery crystals. Dyes from our new quinaldine quaternary salts are similarly prepared, but advantageously by dissolving the reactants in ethyl alcohol and employing one-half molecular proportion of a strong organic base, e. g. piperidine, as condensing agent. An excess (100%) of the quinaldine quaternary salt is advantageously employed. The dye is precipitated with ether after the reaction mixture has stood from 30 to 60 minutes. Dyes from our new μ-methylnaphthothiazole quaternary salts are advantageously prepared from solutions in acetic anhydride using anhydrous sodium acetate as a condensing agent. Four molecular proportions (100% excess) of the quaternary salt and one molecular proportion of the heptadiene compound were placed in acetic anhydride with anhydrous sodium acetate (one molecular proportion plus 400% excess). The quantity of acetic anhydride is about 10 or 15 cc. per each 3 or 4 grams of reactants and condensing agent. The whole can be allowed to stand at —10° C. for about an hour. The reaction mixture should be filtered from unchanged reactants and the dye precipitated with ether.

Pentacarbocyanine dyes can be prepared from our new hydroxyalkyl quaternary salts such as those derived from 1-methyl-benzothiazole, μ-methylnaphthothiazoles and quinaldine for example, by reacting our new hydroxyalkyl quaternary salts with compounds such as 4-acetoxy-$\Delta^{3,5,7}$-nonatriene-1,9-dial ditetrahydroquinolide perchlorate. The procedures given above for tetracarbocyanines is advantageously employed. The heptadiene and nonatriene compounds are described by König (Berichte der deutschen Chemischen Gesellschaft) vol. 67, page 1274 (1934). 4-benzoxy compounds can be used as well as 4-acetoxy.

From the breadth of description given herein, it is clear that we have found that hydroxyalkyl quaternary salts of heterocyclic nitrogen bases can be employed in preparing cyanine dyes of all known types. Our new hydroxyalkyl derivatives of the sensitizing types of cyanine dyes are strong sensitizers and show a lesser tendency to fog photographic emulsions than do the ordinary sensitizing cyanine dyes. Our new β-hydroxyethyl cyanine dyes are especially useful in the preparation of photographic emulsions.

Still further examples of the preparation of our new dyes could be given, but the foregoing is believed to sufficiently represent the mode of obtaining our new dyes.

In the preparation of photographic emulsions containing these new dyes, it is only necessary to disperse the dyes in the emulsion. Our invention is particularly directed to the ordinarily employed gelatino-silver-halide-emulsions. However, our new dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light-sensitive. By way of illustration the hereindescribed emulsions were prepared employing an ordinary gelatino-silver-bromide emulsion or ordinary concentration.

The methods of incorporating dyes in emulsions are simple and well known to those skilled in the art. In practicing our invention, it is convenient to add the dyes from solutions in appropriate solvents. The solvent must, of course, be compatible with the emulsion, substantially free from an deleterious effect on the light-sensitive materials and capable of dissolving the dyes. Methanol and acetone have proven satisfactory as a solvent for our new dyes. The dyes are advantageously incorporated in the finished, washed emulsion and should be uniformly distributed throughout to secure best effects. The emulsion can then be converted into a photographic element by coating upon a support, such as glass, cellulose acetate, cellulose nitrate, other cellulose derivative or resin, in a manner well known in the art.

The concentration of our new dyes in the emulsion can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting our invention in any sense, as it will be apparent that these dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion whereby the dye exerts a sensitizing effect upon the emulsions as well as a photographic element comprising a support, ordinarily transparent, upon which the light-sensitive emulsion is coated or spread and permitted to set or dry. In the case of emulsions containing our new dyes which contain longer polymethenyl chains, such as the tricarbocyanines, the tetracarbocyanines and the pentacarbocyanines, smaller amounts of dyes can be employed to give useful sensitizing effects. From one-fifth to one mg. or more of dye per liter of emulsion can advantageously be employed, for example. The amount of dye which is actually incorporated in a given quantity of emulsion will, of course, vary from dye to dye and emulsion to emulsion and the regulation and adoption of the most economical and useful proportions will be apparent to those skilled in the art.

The accompanying drawing is by way of illustration and depicts the sensitivity of emulsions containing four of our new dyes. Each figure in the drawing is a diagrammatic reproduction of a spectrogram showing the sensitivity of a silver bromide emulsion containing one of our new dyes.

Figure 2:
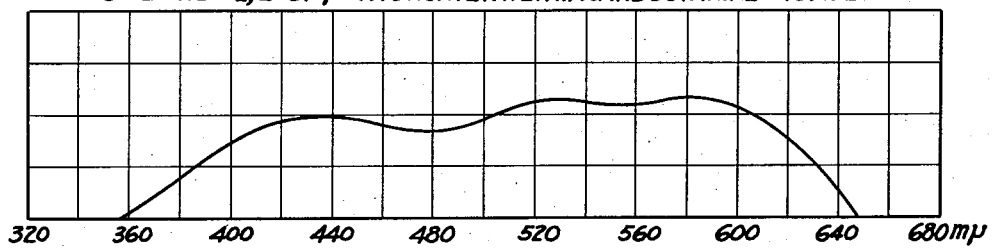
Figure 3:
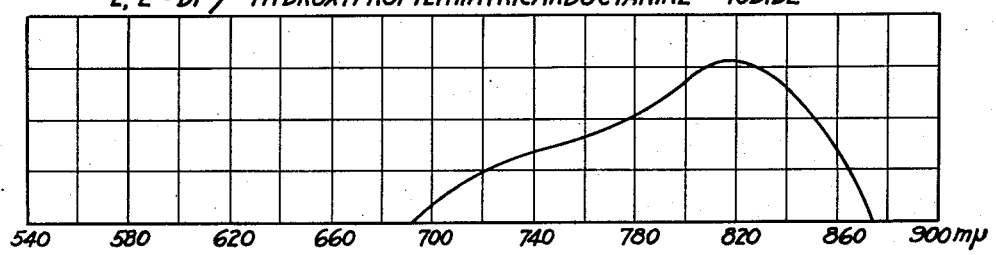
Figure 4:
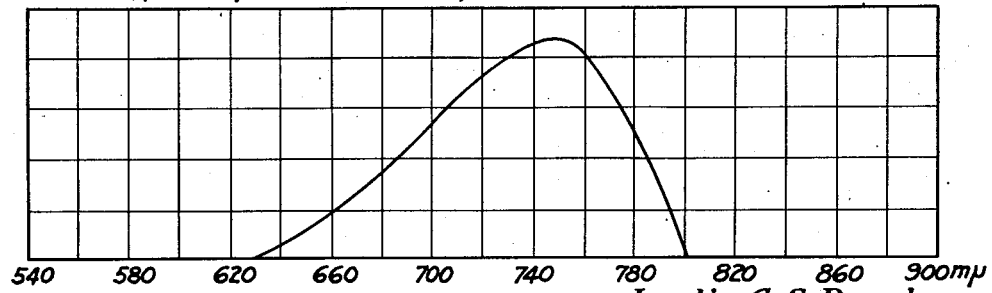

In Fig. 1, the sensitivity of an ordinary gelatino-silver-halide emulsion containing 1'-ethyl-1'-γ-hydroxypropyl-2,2'-cyanine iodide is depicted. In Fig. 2, the sensitivity of an ordinary gelatino-silver-bromide emulsion containing 8-ethyl-2,2'-di-β-hydroxyethyl-thiacarbocyanine iodide is depicted. In Fig. 3, the sensitivity of an ordinary gelatino-silver-bromide emulsion containing 2,2'-di-γ-hydroxypropylthiatricarbocyanine is depicted. In Fig. 4, the sensitivity of an ordinary gelatino-silver-bromide emulsion containing 1,1'-di-β-hydroxyethyl-4,4'-carbocyanine iodide is depicted.

Still further examples illustrating our invention could be cited, but the foregoing will be sufficient to teach those skilled in the art the manner in which our invention is carried out and the principles of sensitizing photographic emulsions with our new dyes.

By the term "the two cyanine nitrogen atoms," we mean the two nitrogen atoms essential to the cyanine dye chromophor, i. e. the two nitrogen atoms, the one tervalent and the other quinquevalent, which are linked together by a conjugated carbon chain.

For example, in a dye, such a 8-ethyl-2,2'-dihydroxyethylthiacarbocyanine iodide, which is formulated as follows:

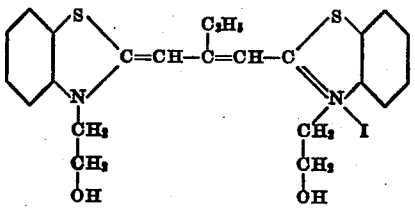

there are two nitrogen atoms (the two cyanine nitrogen atoms) linked together by a conjugated chain.

What we claim and desire to be secured by Letters Patent of the United States is:

1. A photographic silver halide emulsion containing a sensitizing cyanine dye having an alkyl group attached to each of the two cyanine nitrogen atoms, at least one of said alkyl groups being a hydroxyalkyl group.

2. A photographic gelatino-silver-halide emulsion containing a sensitizing cyanine dye having an alkyl group attached to each of the two cyanine nitrogen atoms, at least one of said alkyl groups being a hydroxyalkyl group.

3. A photographic gelatino-silver-halide emulsion containing a sensitizing cyanine dye having an alkyl group attached to each of the two cyanine nitrogen atoms, at least one of said alkyl groups being a hydroxyalkyl group containing at least two carbon atoms.

4. A photographic gelatino-silver-halide emulsion containing a sensitizing cyanine dye having an alkyl group attached to each of the two cyanine nitrogen atoms, at least one of said alkyl groups being a $\beta$-hydroxyethyl group.

5. A photographic gelatino-silver-halide emulsion containing a sensitizing carbocyanine dye having an alkyl group attached to each of the two cyanine nitrogen atoms, at least one of said alkyl groups being a $\beta$-hydroxyethyl group.

6. A photographic gelatino-silver-halide emulsion containing a sensitizing dicarbocyanine dye having an alkyl group attached to each of the two cyanine nitrogen atoms, at least one of said alkyl groups being a $\beta$-hydroxyethyl group.

7. A photographic gelatino-silver-halide emulsion containing a sensitizing tricarbocyanine dye having an alkyl group attached to each of the two cyanine nitrogen atoms, at least one of said alkyl groups being a $\beta$-hydroxyethyl group.

8. A photographic gelatino-silver-halide emulsion containing a sensitizing 4,4'-carbocyanine dye having an alkyl group attached to each of the two cyanine nitrogen atoms, at least one of said alkyl groups being a $\beta$-hydroxyethyl group.

9. A photographic gelatino-silver-halide emulsion containing a sensitizing thiadicarbocyanine dye having an alkyl group attached to each of the two cyanine nitrogen atoms, at least one of said alkyl groups being a $\beta$-hydroxyethyl group.

10. A photographic gelatino-silver-halide emulsion containing a sensitizing thiatricarbocyanine dye having an alkyl group attached to each of the two cyanine nitrogen atoms, at least one of said alkyl groups being a $\beta$-hydroxyethyl group.

11. A photographic gelatino-silver-halide emulsion sensitized for the far red and infra-red regions of the spectrum with 1,1'-di-$\beta$-hydroxyethyl-4,4'-carbocyanine iodide.

12. A photographic gelatino-silver-halide emulsion sensitized for the far red and infra-red regions of the spectrum with 2,2'-di-$\beta$-hydroxyethylthiadicarbocyanine iodide.

13. A photographic gelatino-silver-halide emulsion sensitized for the infra-red regions of the spectrum with 2,2'-di-$\beta$-hydroxyethylthiatricarbocyanine iodide.

LESLIE G. S. BROOKER.
LLOYD A. SMITH.